US012559014B2

(12) United States Patent
Davis et al.

(10) Patent No.: US 12,559,014 B2
(45) Date of Patent: Feb. 24, 2026

(54) DUAL BIN HIGH DUMP TRANSPORT VEHICLE

(71) Applicant: FARMERS UNION INDUSTRIES, LLC, Redwood Falls, MN (US)

(72) Inventors: Josh Davis, Redwood Falls, MN (US); Duane Fennern, Redwood Falls, MN (US); Jamie Braith, Redwood Falls, MN (US); Paul Youngquist, Redwood Falls, MN (US)

(73) Assignee: Farmers Union Industries, LLC, Redwood Falls, MN (US)

( * ) Notice: Subject to any disclaimer, the term of this patent is extended or adjusted under 35 U.S.C. 154(b) by 726 days.

(21) Appl. No.: 17/848,185

(22) Filed: Jun. 23, 2022

(65) Prior Publication Data
US 2022/0410782 A1      Dec. 29, 2022

Related U.S. Application Data

(60) Provisional application No. 63/214,367, filed on Jun. 24, 2021.

(51) Int. Cl.
| | |
|---|---|
| *B60P 1/28* | (2006.01) |
| *B60P 1/16* | (2006.01) |
| *B60P 1/34* | (2006.01) |

(52) U.S. Cl.
CPC ............... *B60P 1/286* (2013.01); *B60P 1/162* (2013.01); *B60P 1/165* (2013.01); *B60P 1/28* (2013.01); *B60P 1/34* (2013.01)

(58) Field of Classification Search
CPC ........... B60P 1/286; B60P 1/162; B60P 1/165; B60P 1/34

(Continued)

(56) References Cited

U.S. PATENT DOCUMENTS

| | | | |
|---|---|---|---|
| 3,205,011 A | 9/1965 | Diem | |
| 3,323,838 A * | 6/1967 | Trucco | B60P 1/165 |
| | | | 298/8 R |

(Continued)

FOREIGN PATENT DOCUMENTS

| | | | |
|---|---|---|---|
| AU | 8800376 | W * | 4/1989 |
| BR | 202020007254 | U2 * | 10/2021 |

(Continued)

OTHER PUBLICATIONS

Amity Technology, "Amity crop chaser multi-crop dump carts", *Sugar Producer*, Mar. 2021.

(Continued)

*Primary Examiner* — Joseph M Rocca
*Assistant Examiner* — Jose Antonio Martinez
(74) *Attorney, Agent, or Firm* — Merchant & Gould P.C.

(57) ABSTRACT

The transport vehicle includes a first assembly that includes a first lifting frame having a portion that at least partially raises from the main frame and a first bin connected to the first lifting frame. The first bin is configured to be raised from the main frame. The transport vehicle includes a second assembly that includes a second lifting frame that has a portion that at least partially raises from the main frame. The second assembly includes a second bin connected to the second lifting frame. The second bin is configured to be raised from the main frame. The transport vehicle includes a hydraulic system in communication with the first and second assemblies. The hydraulic system allows operation of only one of the first and second assemblies at a time.

21 Claims, 11 Drawing Sheets

(58) Field of Classification Search
USPC ...... 298/8 R, 10, 11, 13, 14, 17 R, 18, 19 R, 298/22 R, 22 C, 22 P, 17 B; 1/4, 16, 28, 1/30, 34, 165, 167, 283, 286
See application file for complete search history.

(56)                References Cited

U.S. PATENT DOCUMENTS

| | | | |
|---|---|---|---|
| 3,409,328 | A | 11/1968 | Hamby et al. |
| 4,148,527 | A | 4/1979 | Steele |
| 4,458,588 | A | 7/1984 | Steele |
| 4,619,484 | A * | 10/1986 | Maxey ................... B60P 1/165 |
| | | | 105/275 |
| 5,308,142 | A | 5/1994 | Forslund, III et al. |
| 5,380,142 | A | 1/1995 | Hornung et al. |
| 5,826,947 | A | 10/1998 | Hornung et al. |
| 5,845,971 | A * | 12/1998 | Rogers ................... B60P 1/165 |
| | | | 410/49 |
| 5,967,615 | A | 10/1999 | Rogers |
| 6,199,955 | B1 | 3/2001 | Rogers |
| 11,491,904 | B1 * | 11/2022 | Meyer ....................... B66F 9/22 |
| 11,724,632 | B1 | 8/2023 | Meyer et al. |
| 2018/0126894 | A1 | 5/2018 | Ross et al. |
| 2021/0032023 | A1 * | 2/2021 | Musso .................. B65F 1/1615 |

FOREIGN PATENT DOCUMENTS

| | | |
|---|---|---|
| DE | 102016011278 A1 | 9/2016 |
| EP | 2055526 A1 | 10/2007 |

OTHER PUBLICATIONS

Colombo North America, "Colombo Dump Cart 6500", Jul. 7, 2020, http://colombona.com/colombo-dump-cart-cta-6500/.

Kelley Manufacturing Co., "KMC Kelley Dump Cart", Jul. 7, 2020, Hydraulic Dump Cart—Kelley Manufacturing (kelleymfg.com).

Amadas Industires, "In-Field Crop Transporter", ICT-1100-S-Handout-FINAL.pdf (amadas.com).

* cited by examiner

DUAL BIN HIGH DUMP TRANSPORT VEHICLE

CROSS REFERENCE TO RELATED APPLICATIONS

This application claims priority to U.S. Provisional Application No. 63/214,367, filed Jun. 24, 2021, which is incorporated herein by reference in its entirety.

BACKGROUND

Transport vehicles are used to move harvested crop material from a harvesting machine to a shipping vehicle, such as a truck. Transport vehicles are configured to transfer material from the transport vehicle over the sidewall of the shipping vehicle, often achieved by using a dumping bin that tilts at a point at or near the top of the sidewall of a shipping vehicle. Such a transport vehicle is often referred to as a high dump trailer.

Existing transport vehicles have a limited capacity due to the weight of the harvested material and the likelihood the transport vehicle will become unstable when fully loaded. Further, because transport vehicles are often driven within a field, the transport vehicle can get easily stuck in the soil of the field, especially with a full payload. Therefore, loading the transport vehicle with additional harvested material is often discouraged.

Therefore, improvements are desired.

SUMMARY

This application generally relates to transport vehicles. Specifically, a transport vehicle having a pair of raising and tilting material bins is disclosed herein.

In one aspect of the present disclosure, a transport vehicle is disclosed. The transport vehicle includes a main frame that has a longitudinal axis. The main frame has a first end, a second end, and a pair of sides extending therebetween. The first end of the main frame includes a trailer hitch. The transport vehicle includes at least three axles, and each axle includes a pair of supports to support the main frame. The transport vehicle includes a first assembly that is positioned at the first end of the main frame. The first assembly includes a first lifting frame having a portion that at least partially raises from the main frame and a first bin that has an open top and is connected to the first lifting frame. The first bin is configured to be raised from the main frame and rotated toward a side of the main frame by the first lifting frame. The transport vehicle includes a second assembly being positioned at the second end of the main frame. The second assembly includes a second lifting frame that has a portion that at least partially raises from the main frame. The second assembly includes a second bin that has an open top and is connected to the second lifting frame. The second bin is configured to be raised from the main frame, and the second bin is configured to be rotated to the same side of the main frame as the first bin. At least two of the three axles are positioned under the second bin. The transport vehicle includes a hydraulic system in communication with the first and second assemblies. The hydraulic system allows operation of only one of the first and second assemblies at a time.

In another aspect of the present disclosure, a transport vehicle is disclosed. The transport vehicle includes a main frame that has a longitudinal axis. The main frame has a first end, a second end, and a pair of sides extending therebetween. The first end of the main frame includes a trailer hitch. The transport vehicle includes at least three axles, and each axle includes a pair of supports to support the main frame. The transport vehicle includes a first assembly that is positioned at the first end of the main frame. The first assembly includes a first lifting frame parallel with the longitudinal axis of the main frame and extending upward. The first assembly includes a first bin that has an open top connected to the first lifting frame and a first bin lifting actuator connected to the first lifting frame and at the first bin at a first bin lifting pivot point. The first assembly includes a first bin tilting actuator connected to the first lifting frame and at the first bin at a first bin tilting pivot point. Upon extension of the first bin lifting actuator and of the first bin tilting actuator, the first bin is raised from the main frame and rotated about the first bin lifting pivot point to at least partially invert the first bin toward a side of the main frame. The transport vehicle includes a second assembly positioned at the second end of the main frame. The second assembly includes a second lifting frame parallel with the longitudinal axis of the main frame and extending upward. The second assembly includes a second bin that has an open top connected to the second lifting frame and a second bin lifting actuator connected to the second lifting frame and at the second bin at a second bin lifting pivot point. The second assembly includes a second bin tilting actuator connected to the second lifting frame and at the second bin at a second bin tilting pivot point. Upon extension of the second bin lifting actuator and of the second bin tilting actuator, the second bin is raised from the main frame and rotated about the second bin lifting pivot point to at least partially invert the second bin toward a side of the main frame. The transport vehicle includes a hydraulic system in fluid communication with the lifting and tilting actuators of the first and second assemblies. The hydraulic system allows operation of only one of the first or second assemblies at a time.

In another aspect of the present disclosure, a method of operating a transport vehicle is disclosed. The method includes providing a transport vehicle that includes a main frame that has a longitudinal axis. The main frame has a first end, a second end, and a pair of sides extending therebetween. The first end of the main frame includes a trailer hitch, at least three axles, and each axle includes a pair of supports to support the main frame. The transport vehicle includes a first assembly positioned at the first end of the main frame. The first assembly includes a first lifting frame parallel with the longitudinal axis of the main frame and extending upward. The first assembly includes a first bin that has an open top connected to the first lifting frame and a first bin lifting actuator connected to the first lifting frame and at the first bin at a first bin lifting pivot point. The first assembly includes a first bin tilting actuator connected to the first lifting frame and at the first bin at a first bin tilting pivot point. Upon extension of the first bin lifting actuator and of the first bin tilting actuator, the first bin is raised from the main frame and rotated about the first bin lifting pivot point to at least partially invert the first bin toward a side of the main frame. The transport vehicle includes a second assembly positioned at the second end of the main frame. The second assembly includes a second lifting frame parallel with the longitudinal axis of the main frame and extending upward and a second bin that has an open top connected to the second lifting frame. The second assembly includes a second bin lifting actuator connected to the second lifting frame and at the second bin at a second bin lifting pivot point and a second bin tilting actuator connected to the second lifting frame and at the second bin at a second bin tilting pivot point. Upon extension of the second bin lifting actuator and of the second bin tilting actuator, the second bin is raised from the main frame and rotated about the second bin lifting pivot point to at least partially invert the second bin toward a side of the main frame. The transport vehicle includes a hydraulic system in communication with the lifting and tilting actuators of the first and second assemblies. The method includes extending the lifting and tilting actuators of the first assembly. The method includes raising the first bin from the main frame and inverting the first bin to a side of the main frame.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Various embodiments will be described in detail with reference to the drawings, wherein like reference to numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The transport vehicle disclosed herein provides a vehicle that is capable of being towed behind a tow vehicle, such as a tractor or truck. Further, the transport vehicle is capable of unloading material at a high point to allow for dumping of material from the transport vehicle to an open top trailer, such as a semi-truck. The transport vehicle has a capacity that allows the transport vehicle to collect material in a large quantity without needing multiple loads to load a semi-truck trailer. This allows for efficient operation while requiring limited labor and vehicles. Further, stability of the transport vehicle is optimized by utilizing a variety of different arrangements such as, but not limited to, axle numbers and placement, hydraulic system configuration, and frame design.

Figure 1:
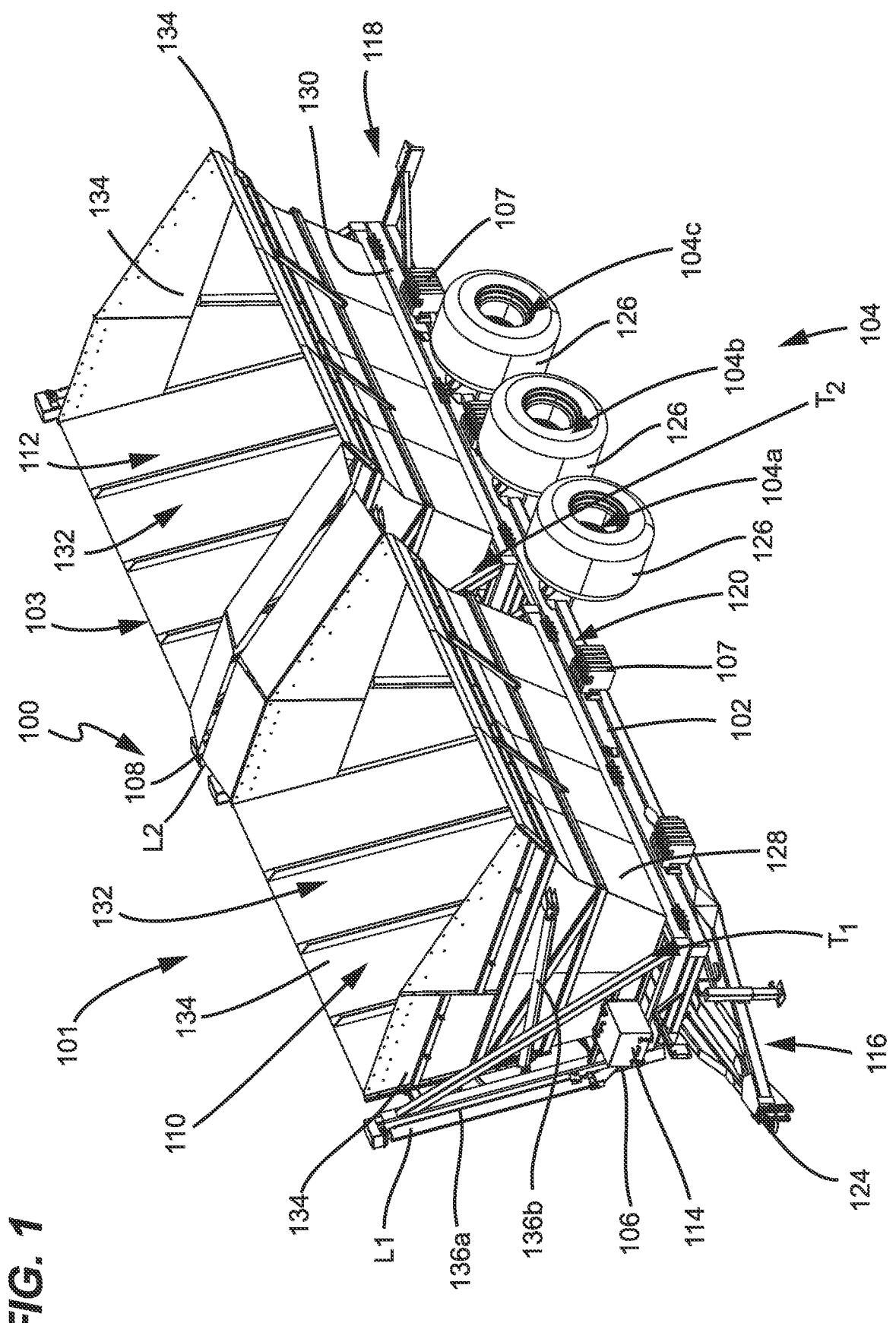
FIG. 1 is a left perspective view of a transport vehicle according to the principles of the present disclosure.
Figure 2:
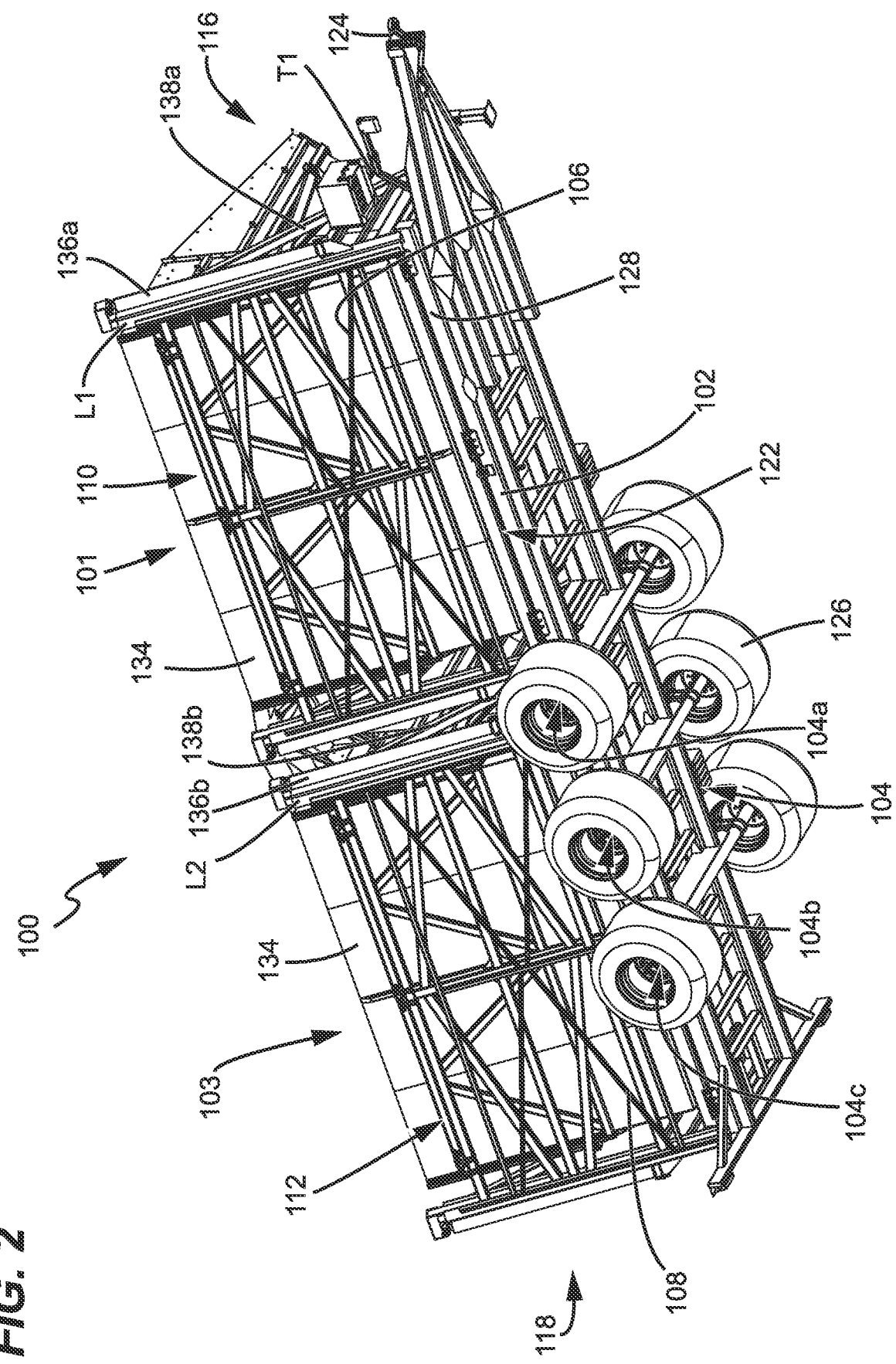
FIG. 2 is a right perspective view of the transport vehicle of FIG. 1.
Figure 3:
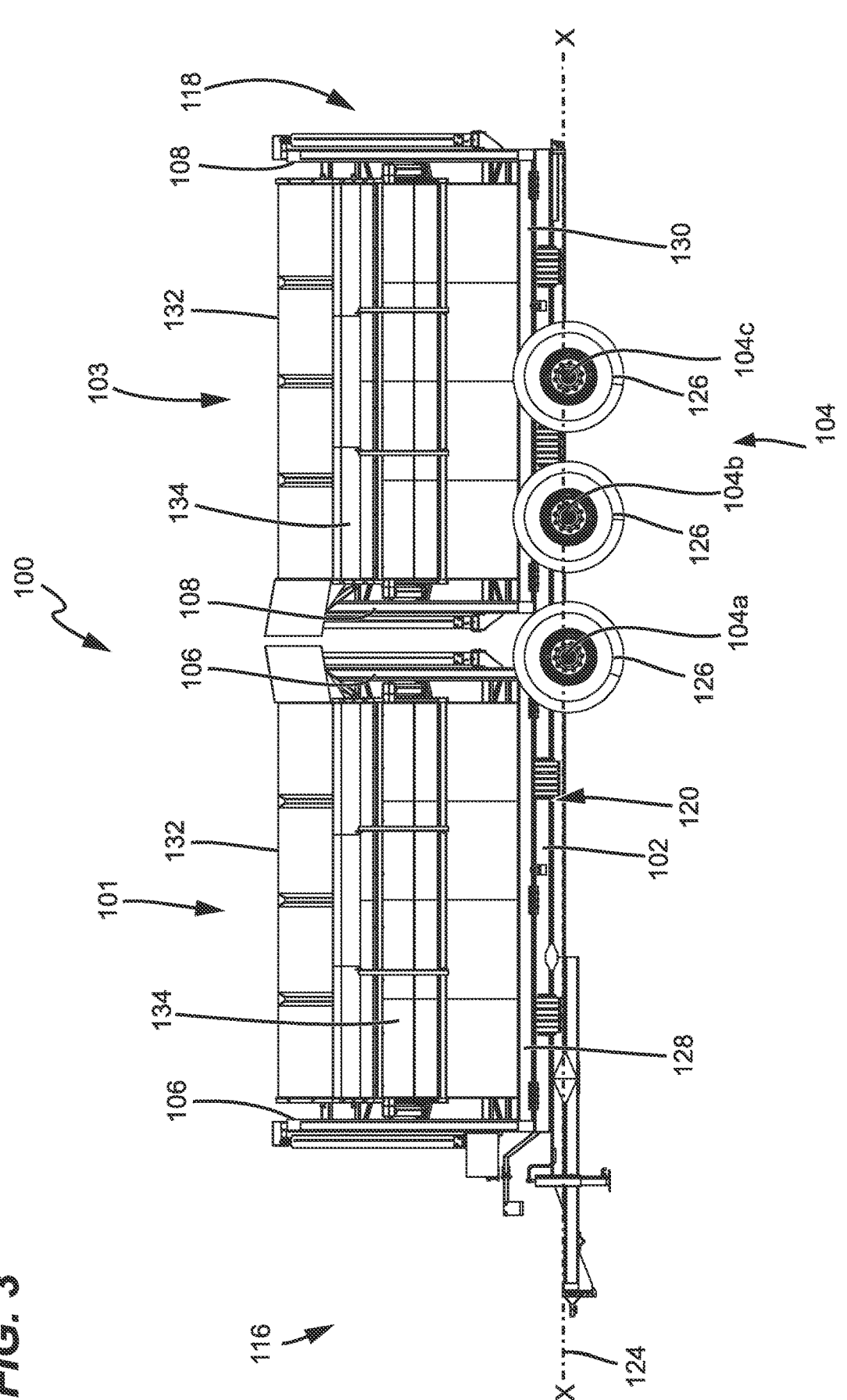
FIG. 3 is a left side view of the transport vehicle of FIG. 1.
Figure 4:
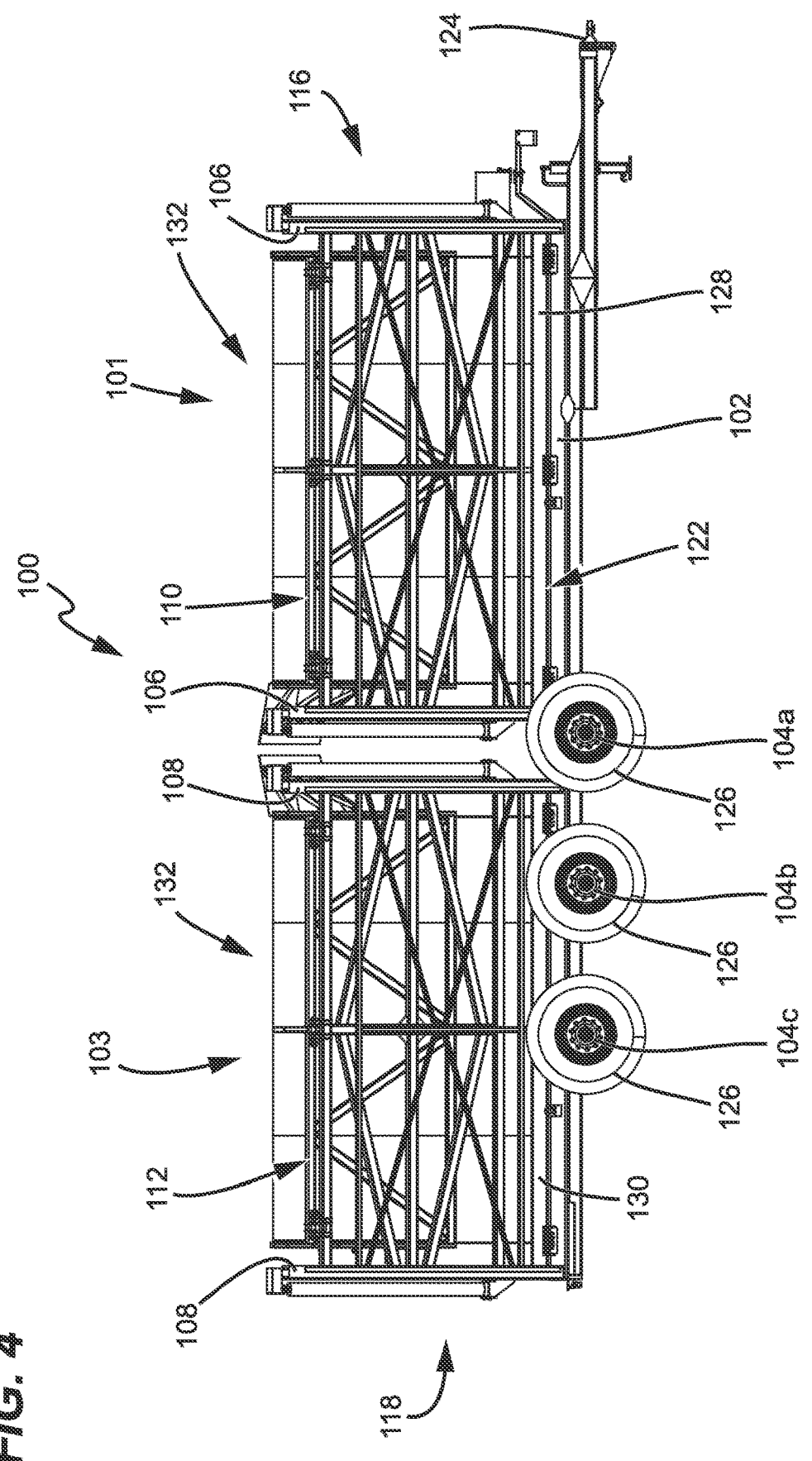
FIG. 4 is a right side view of the transport vehicle of FIG. 1.
Figure 5:
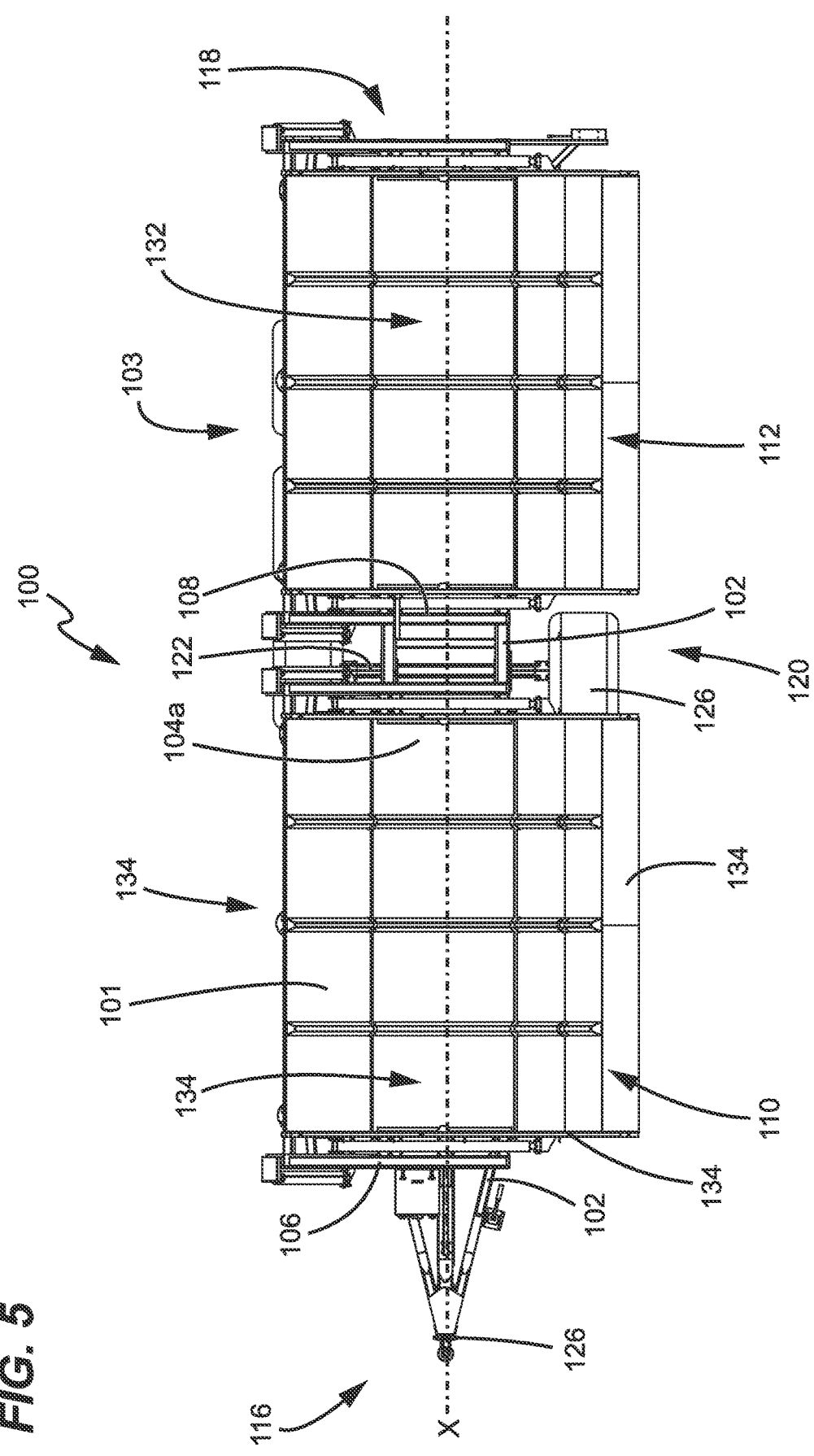
FIG. 5 is a top side view of the transport vehicle of FIG. 1.
Figure 6:
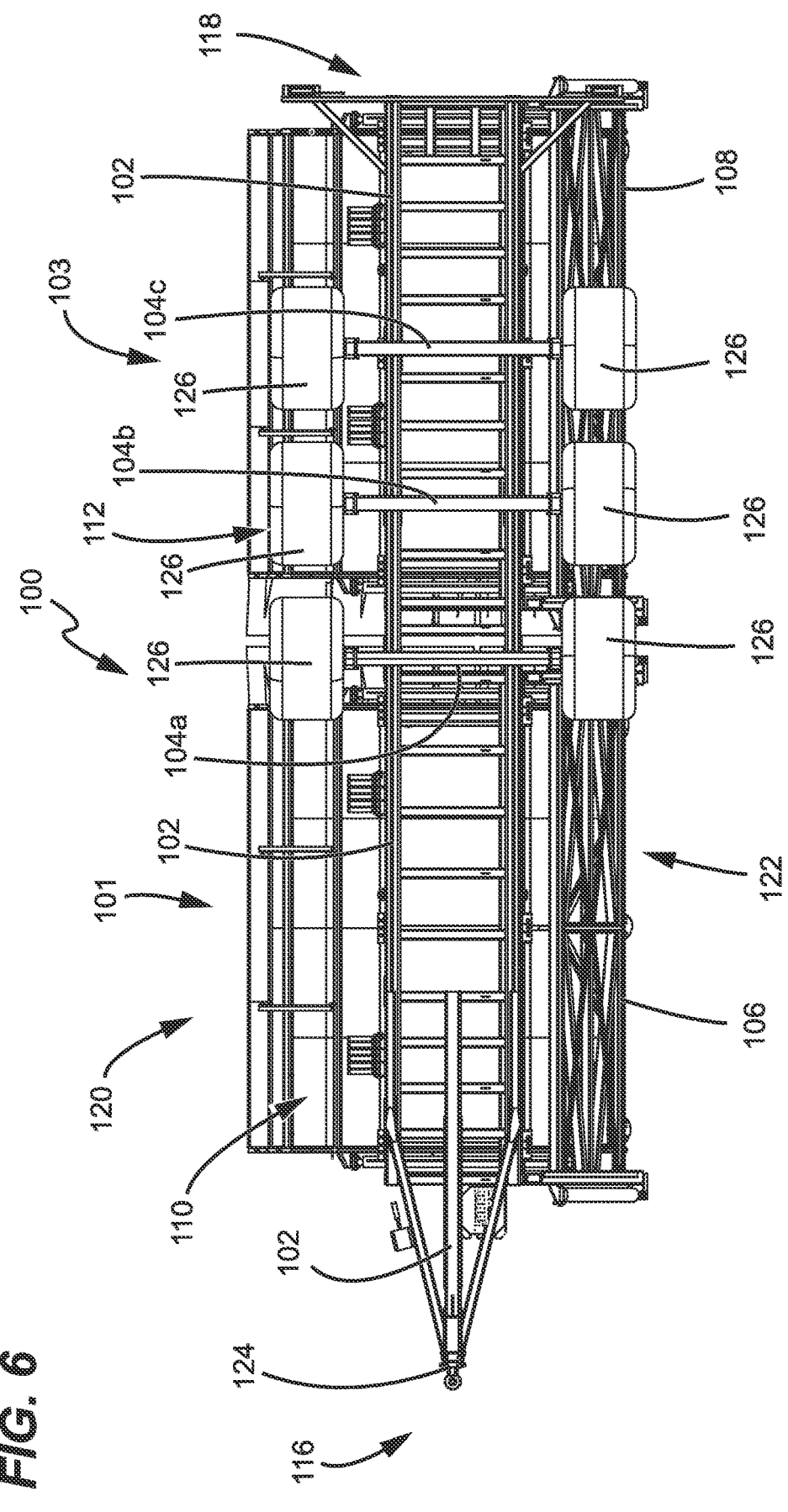
FIG. 6 is a bottom side view of the transport vehicle of FIG. 1.
Figure 7:
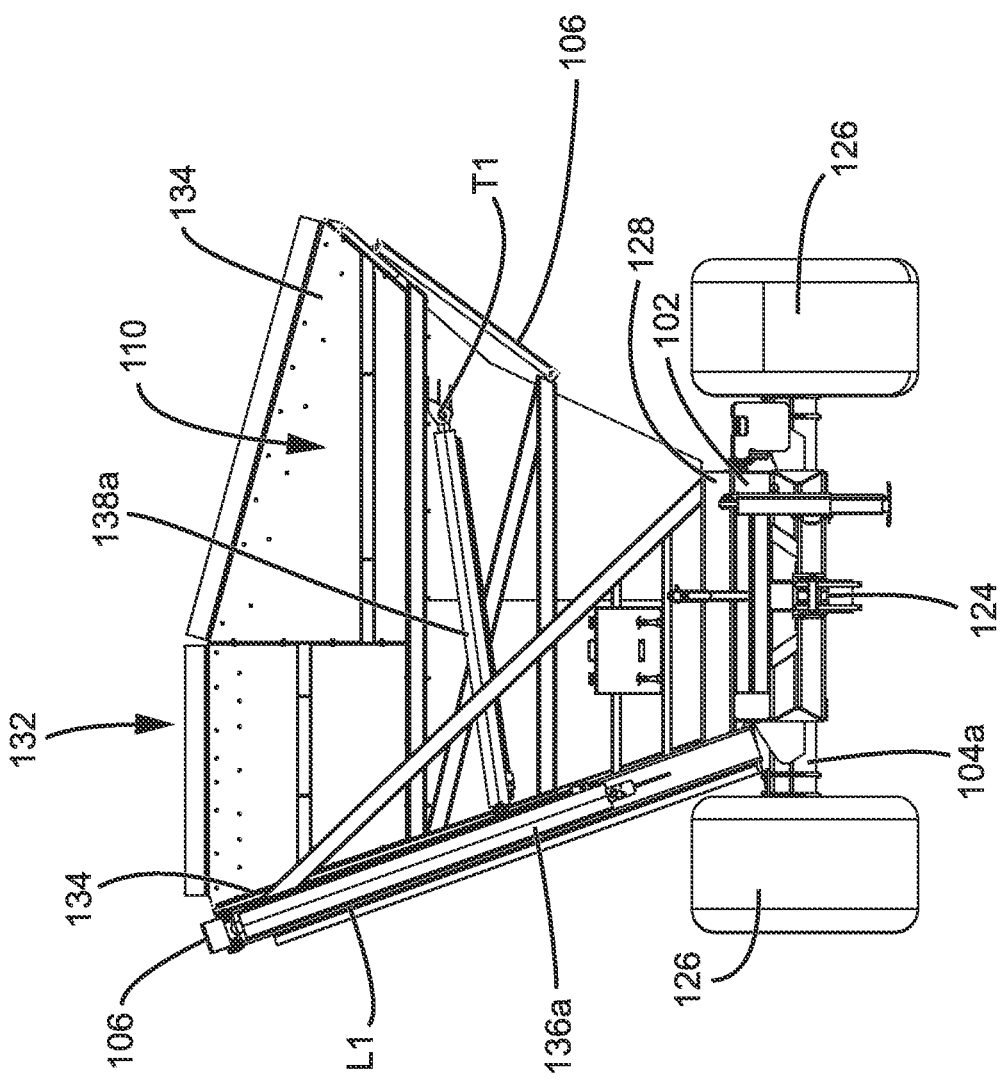
FIG. 7 is a front side view of the transport vehicle of FIG. 1.

FIGS. 1-2 illustrate perspective views of an example of a transport vehicle 100 according to the principles of the present disclosure. FIGS. 3-4 illustrate side views of the transport vehicle 100. FIGS. 5-6 illustrate top and bottom views of the transport vehicle 100. FIG. 7 illustrates a front view of the transport vehicle 100.

The transport vehicle 100 includes a first assembly 101 and a second assembly 103. In some examples, the first and second assemblies are substantially similar. The first assembly 101 includes a first lifting frame 106 and a first bin 110 while the second assembly 103 includes a second lifting frame 108 and a second bin 112. The transport vehicle 100 includes a main frame 102, axles 104, and a hydraulic system 114.

The transport vehicle 100 is configured to transport material, such as harvested crop. In an example application, the transport vehicle 100 can be towed behind a tractor in a field as crop is being harvested by a harvesting machine, and the harvested crop can be directly deposited from the harvesting machine into the transport vehicle 100. The transport vehicle 100 is constructed to allow for travel in a field where conditions are variable, such as limited traction (e.g., mud) and uneven surfaces. Such field conditions would be unfavorable for an on-road shipping vehicle (e.g., a semi-truck). Once the transport vehicle 100 is filled with the desired amount of harvested crop, the transport vehicle 100 is towed to a waiting shipping vehicle, such as an open-top trailer attached to a semi-truck trailer. To deposit the harvested material in the open-top trailer of the semi-truck, the transport vehicle 100 uses the lifting frames 106, 108 connected to the first and second bins 110, 112 to raise and invert the bins 110, 112 to allow for the transport vehicle 100 to transfer, i.e., dump, the material into the open-top trailer. In some examples, the transport vehicle 100 is prevented from raising and inverting both bins 110, 112 at the same time so as to maintain stability of the transport vehicle 100. In some examples, the pair of bins 110, 112 can store enough material so as to fill the open top trailer in a single transferring action.

The main frame 102 supports the lifting frames 106 and 108 and bins 110, 112 on the axles 104. The main frame 102 has a first end 116, a second end 118, and a pair of sides 120, 122 extending between the first and second ends 116, 118. The main frame 102 also has a longitudinal axis X that extends along the length of the main frame 102. In some examples, the main frame 102 extends continuously under the first and second bins 110, 112. In some examples, the main frame 102 is a rigid metal frame with limited flexibility. In some examples, the main frame includes multiple segments that are interconnected. In some examples, the interconnected segments are movable relative to one another. In some examples, the frame 102 includes counterweights 107 mounted thereto. In some examples, the counterweights can be easily removed from and attached to the frame 102 to provide additional weight to the frame 102 for stability. As depicted, the first end 116 of the main frame 102 includes a trailer hitch 124. The trailer hitch 124 allows the main frame 102, and thereby the transport vehicle 100, to be attached to a tow vehicle (e.g., a tractor) for transport.

The axles 104 are configured to support the transport vehicle 100 and allow the transport vehicle to be moved by a tow vehicle. Further, each axle 104a, 104b, 105c includes supports 126 to support the main frame 102. The supports 126 can be, but are not limited to, wheels, tracks, skids, etc. In some examples, the supports 126 are floatation tires to limit compaction of the field and to help the transport vehicle 100 maintain traction. For example, floatation tires can be used to help reduce the likelihood of the transport vehicle 100 becoming stuck in a wet field.

In some examples, the transport vehicle 100 has at least three axles 104. As shown in the side views of FIGS. 3-4, at least two of the three axles, 104c and 104b, are positioned under the second bin 112. In some examples, at least two axles are positioned closer to the second end 118 than the first end 116 of the main frame 102. In some examples, straight axles can be utilized. Such positioning can aid in maintaining the stability of the transport vehicle, as well as control the amount of weight that is transformed through the trailer hitch 124 and downward on the tow vehicle (i.e., tongue weight).

The first and second lifting frames 106, 108 are substantially similar. The first lifting frame 106 is connected to the first bin 110 and the second lifting frame 108 is connected to the second bin 112 so that the first and second lifting frames 106, 108 can lift the first and second bins 110, 112 from the main frame 102. In some examples, the lifting frames 106, 108 are telescoping and each contain multiple segments. In some examples, each lifting frame mounts each bin 110, 112, to first and second sub-frames 128, 130, respectively, where the first and second sub-frames 128, 130 are connected to the main frame 102. This allows for ease of maintenance and assembly as well as increasing the overall rigidity of the transport vehicle 100.

The first and second bins 110 and 112 are configured to receive material for transport and are substantially similar. In some examples, the first and second bins 110, 112 have open tops 132. In some examples, the first and second bins 110, 112 have lids covering the tops that are connected by a hinge. The first and second bins 110, 112 are connected to the first and second lifting frames 106 108, respectively. The lifting frames 106, 108 allow the first and second bins 110, 112 to have a loading position, as shown in FIG. 1, and an unloading position, as shown by the second bin 112 in FIG. 8. In the loading position, the first and second bins 110, 112 are positioned immediately adjacent the main frame 102. In some examples, when in the unloading position, the first and second bins 110, 112 are raised from the loading position and lifted from the main frame 102. The first and second bins 110, 112 are configured to be raised from the main frame 102 and be at least partially inverted toward a side 120, 122 of the main frame 102. In the depicted examples, the first and second bins 110, 112 are configured to be inverted toward the side 122 of the main frame 102. The first and second bins 110, 112 can also be configured to be inverted toward the side 120 of the main frame 102. In some examples, the first and second bins 110, 112 can be inverted toward opposite sides of the main frame 102.

In some examples, the first and second bins 110, 112 have sides 134 that converge from the top to the bottom to urge material to the bottom of the bins 110, 112. In some examples, the sides 134 of the bins 110, 112 can have different heights. For example, the side 134 of the bin that is on the side 120, 122 of the main frame 102 that the bin inverts toward is higher from the main frame 102 than the other side 134 of the bin. In some examples, the side 134 opposite from the side 120, 122 of the main frame 102 that the bin inverts toward is the shortest out of all the sides 134 to allow for material to be easily loaded therein.

The hydraulic system 114 is shown schematically in FIG. 1. The hydraulic system 114 can contain traditional hydraulic components such as valves, sensors, motors, etc. The hydraulic system 114 of the transport vehicle 100 can be configured to be connected to a hydraulic system of a towing vehicle, such as a tractor, that has a hydraulic motor. In some examples, the hydraulic system 114 can accept hydraulic fluid up to 25 GPM at 3500 PSI. In some examples, the hydraulic system 114 is configured to operate with closed center hydraulics systems. In some examples, the hydraulic system 114 is configured to be a standalone system having at least one hydraulic motor and does not require connection to a tow vehicle. The hydraulic system 114 is configured to control the position of the first and second bins 110, 112 between the loading and unloading positions. As used herein, the term "hydraulic" means and includes any system commonly referred to as a hydraulic or pneumatic system, while the term "hydraulic fluid" means and includes any incompressible or compressible fluid that may be used as a working fluid in such a hydraulic or pneumatic system. In some examples, instead of the hydraulic system 114, an electrical system having at least one electrical motor can be used.

In the depicted examples, the hydraulic system 114 is fluidly connected to the first and second assemblies 101, 103. Specifically, the hydraulic system 114 is connected to lifting actuators 136a, 136b and tilting actuators 138a, 138b of the first and second assemblies 101, 103. respectively. While only a single lifting and tilting actuator is shown for each assembly 101, 103, it is within the scope of the present disclosure that the assemblies 101, 103 can have more than one lifting and tilting actuator, respectively. For example, each assembly 101, 103 can include a pair of lifting and tilting actuators at opposing sides of the bins 110, 112 where the actuators are configured to operate with one another.

The first bin 110 is connected to the lifting actuator 136a of the first assembly 101 at a first bin lifting pivot point L1. The first bin 110 is connected to the tilting actuator 138a of the first assembly 101 at a first bin tilting pivot point T1. The second bin 112 is connected to the lifting actuator 136b of the second assembly 103 at a second bin lifting pivot point L2. The second bin 112 is connected to the tilting actuator 138b of the second assembly 103 at a second bin tilting pivot point T2. In the depicted example, the first and second lifting pivot points L1, L2 are below the tops of the bins 110, 112. In some examples, the first and second lifting pivot points L1, L2 are at the tops of the bins 110, 112.

Figure 8:
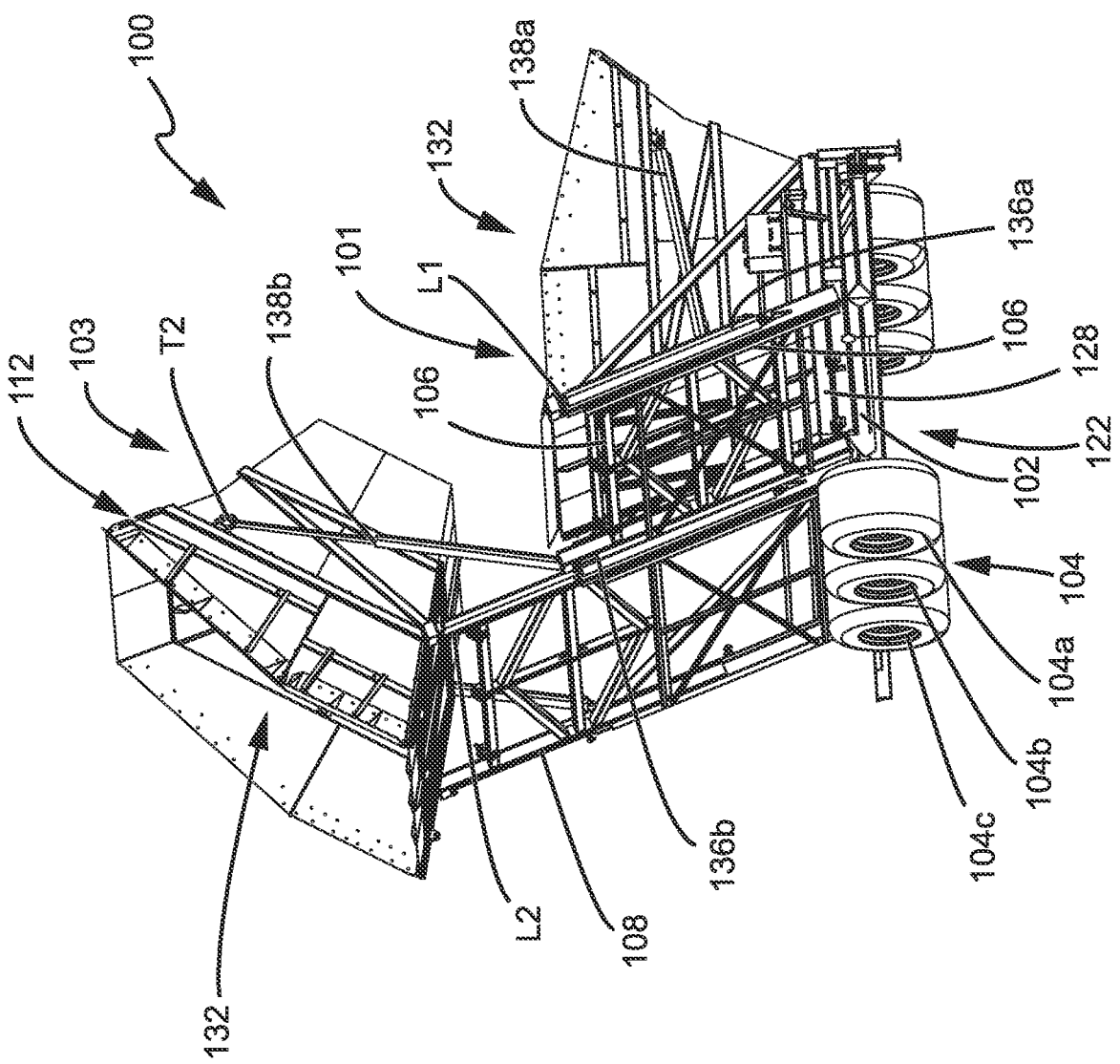
FIG. 8 is a right perspective view of the transport vehicle of FIG. 1 with a second bin in an unloading position.

FIG. 8 shows a perspective view of the transport vehicle 100 with the first bin 110 in the loading position while the second bin 112 is shown in the unloading position. While only the second bin 112 is shown in the unloading position, the first bin 110 can also be positioned in a similar, raised, and inverted unloading position. In some examples, the hydraulic system 114 prevents the first and second bins 110, 112 from being positioned in the unloading position at the same time. As shown, when in the unloading position, the lifting actuator 136b and the tilting actuator 138b are extended so as to raise and invert the second bin 113 to allow unloading into a shipping vehicle.

The lifting actuators 136a, 136b are extendable, e.g., telescoping, using hydraulic fluid. In some examples, the lifting actuators 136a, 136b are hydraulic actuators having a piston. In some examples, the lifting actuators 136a, 136b extend to the top side of the first and second bins 110, 112 so as to lift the bins 110, 112 when the lifting actuators 136a, 136b are extended. In some examples, the lifting actuators 136a, 136b are connected directly to the lifting frames 106, 108. In some examples, the lifting actuators are connected directly to the bins 110, 112. In some examples, the lifting actuators 136a, 136b are connected to the main frame 102 at lower sides. In some examples, the lifting actuators 136a, 136b are connected to the sub-frames 128, 130. In some examples, the lifting frames 106, 108 include telescoping segments and the lifting actuators can be connected to different segments to move the segments relative to one another.

Like the lifting actuators 136a, 136b, the tilting actuators 138a, 138b are extendable using hydraulic fluid. In some examples, the tilting actuators 138a, 138b are hydraulic actuators having a piston. In some examples, each tilting actuator 138a, 138b spans a portion of the width of the first and second bins 110, 112. Specifically, each tilting actuator 138a, 138b extends to the opposing side 134 of the bins 110, 112 from where the lifting actuator 136a, 136b is connected. When extended, the tilting actuators 138a, 138b invert the bins 110, 112 to allow the bins 110, 112 to be dumped. In some examples, the lifting and tilting actuators 136a/136b, 138a/138b of each assembly 101, 103 are operable independent of one another to accommodate different scenarios where the bins 110, 112 need to be inverted. In some examples, the tilting actuators 138a, 138b are connected directly to the lifting frames 106, 108 and directly to the bins 110, 112. In some examples, the tilting actuators 138a, 138b are connected to the main frame 102. In some examples, tilting actuators 138a, 138b are connected to the sub-frames 128, 130.

Upon extension of the lifting actuators 136a, 136b and of the tilting actuators 138a, 138b of the first and second assemblies 101, 103, via the hydraulic system 114, the first and second bins 110, 112 are raised from the main frame 102 and rotated about the first and second bin lifting pivot points L1, L2, respectively, to at least partially invert the first and second bins 110, 112 to the unloading position toward a side of the main frame 102.

Figure 9:
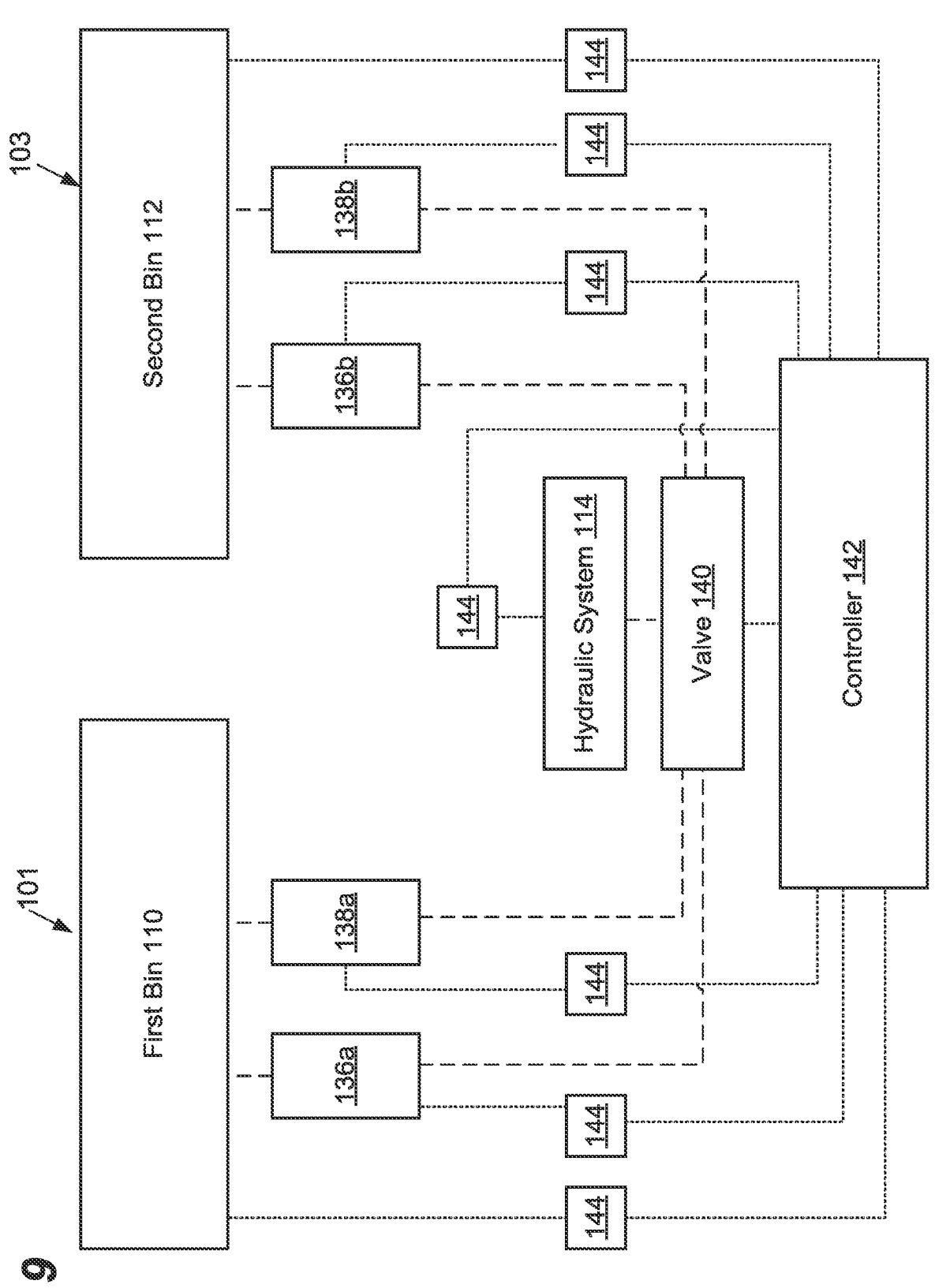
FIG. 9 is a schematic of a control system of the transport vehicle of FIG. 1.

A schematic of the transport vehicle 100 is shown in FIG. 9. As noted above, the hydraulic system 114 is fluidly connected to lifting and tilting actuators 136a/136b, 138a/138b of the first and second lifting frames 106, 108, respectively. In some examples, the hydraulic system 114 can include a valve 140 that only allows the lifting and tilting actuators 136a/136b, 138a/138b of one of the first and second assemblies 101, 103 to be operated at a time. In some examples, the valve 140 is a sequencing valve. In some examples, more than one valve 140 is used. In some examples, a controller 142 can be used to limit operation of one of the first or second assemblies 101, 103 at a time. In some examples, the controller 142 can be used in conjunction with the valve 140 to aid in controlling the hydraulic system 114.

In some examples, the hydraulic system 114 includes four functions all being actuated with 12 VDC power. In some examples, the hydraulic system 114 and the controller 142 are positioned within a sealed enclosure. In some examples, the hydraulic system 114 includes manual overrides to enable an operator to partially operate components of the hydraulic system 114 in the event of lost power.

In some examples, the lifting and tilting actuators 136a/136b, 138a/138b can include a failure protection feature. In some examples, in the event of a fluid line failure anywhere in the hydraulic system 114, the lifting and tilting actuators 136a/136b, 138a/138b will remain in their position until fluid flow is resumed. In some examples, the hydraulic system 114 requires hydraulic fluid flow to operate the lifting and tilting actuators 136a/136b, 138a/138b. Therefore, in the event of lost fluid flow, the first and second bins 110, 112 will remain in the position they were last operated in before fluid flow was lost.

The controller 142 can execute a plurality of software instructions that, when executed by the controller 142, cause the hydraulic system 114 to implement the methods and otherwise operate and have functionality as described herein. The controller 142 may comprise a device commonly referred to as a microprocessor, central processing unit (CPU), digital signal processor (DSP), or other similar device and may be embodied as a standalone unit or as a device shared with components of the hydraulic system 114. The controller 142 may include memory for storing the software instructions, or the transport vehicle 100 may further comprise a separate memory device for storing the software instructions that is electrically connected to the controller 142, allowing bi-directional communication of the instructions, data, and signals therebetween. Embodiments of the disclosure may also be practiced using other technologies capable of performing logical operations such as, for example, AND, OR, and NOT, including but not limited to, mechanical, optical, fluidic, and quantum technologies. In addition, aspects of the methods described herein can be practiced within a general purpose computer or in any other circuits or systems.

The transport vehicle 100 can also include a plurality of sensors 144, such as pressure and temperature sensors, to monitor the status of the hydraulic system 114 as well as sensors to monitor properties of the first and second assemblies 101, 103, such as weight sensors.

In some examples, the sensors 144 are configured to output signals corresponding to measurements of the one or more properties of the material contained with the first and second bins 110, 112, positions of the first and second bins 110, 112, and/or properties of the components of the hydraulic system 114. A communication link (shown by dashed lines in FIG. 9) can connect the sensors 144 to the controller 142 for the communication of such output signals to the controller 142, and may utilize wired and/or wireless communication devices and methods for such communication.

Sensors 144 can be positioned in a variety of different locations on the transport vehicle 110. In some examples, sensors 144 are connected to the first and second bins 110, 112. In some examples, sensors 144 are connected to the lifting and tilting actuators 136a/136b, 138a/138b. In some examples, sensors 144 are connected to the valve 140. In some examples, sensors 144 are connected to the other components of the hydraulic system 114. In some examples, a sensor 144 can be used to measure a property of at least one of the first and second bins 110, 112. In some examples, a sensor 144 can be used to sense the existence of material within at least one of the first and second bins 110, 112.

In some examples, the sensors 144 can be a weight sensor, a pressure sensor, a temperature sensor, a proximity sensor, a transducer, an imaging sensor, an accelerometer, a gyroscopic sensor, a tilt sensor, etc. For example, a sensor 144 can be used to determine the position of the first and second bins 110, 112 to ensure only one of the first and second assemblies 101, 103 is controlled at a time. In another example, a weight sensor can be used to determine when a bin 110, 112 is at capacity, provide data to the shipper, and/or provide crop yield data. In another example, a pressure sensor is used on a lifting and/or tiling actuator to prevent accidental damage to the actuator, as well as the overall hydraulic system 114. Additionally, the pressure sensor can provide data to enable easier troubleshooting in case of a malfunction of the transport vehicle 100. In still another example, an imaging sensor can be used to display the inside of the bins 110, 112 to the operator so that the operator can monitor the status of the material within the bins 110, 112. It is understood and considered part of this disclosure that there are a variety of methods and types of sensors that may be used to measure one or more properties related to at least one of the first and second bins 110, 112 and/or hydraulic system 114.

Figure 10:
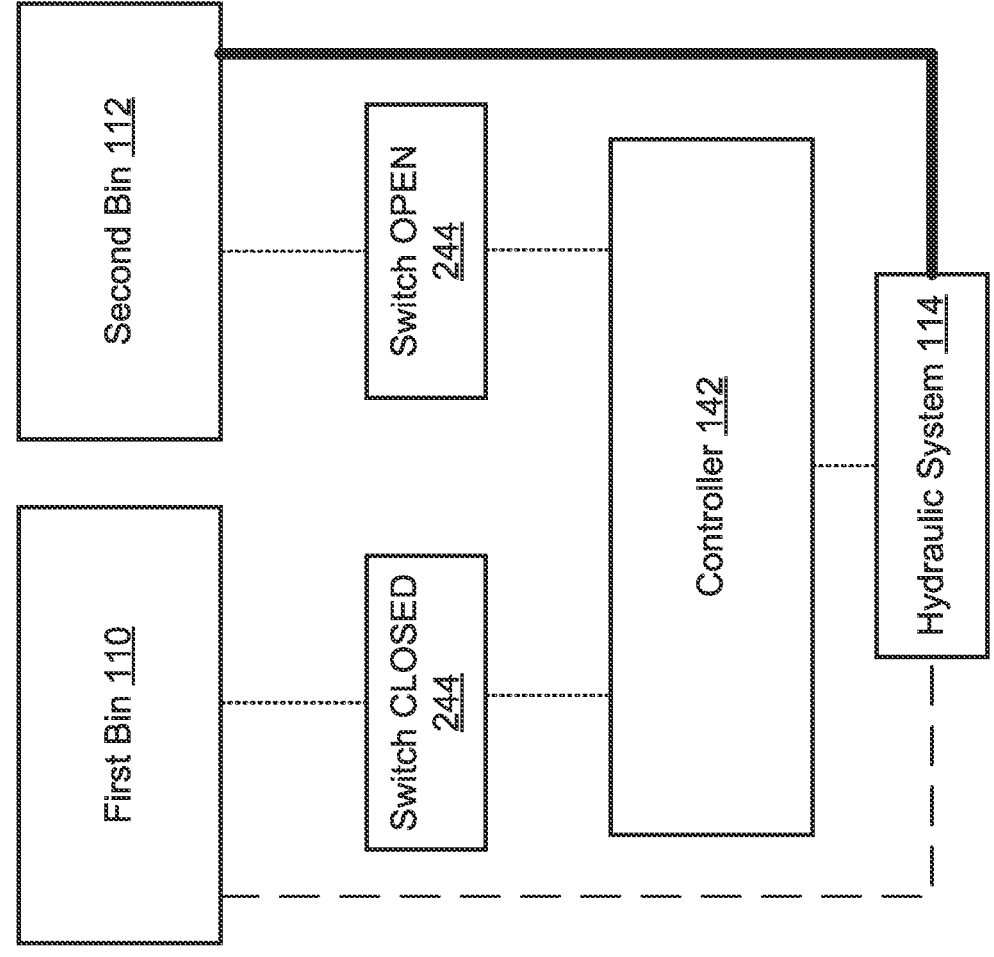
FIG. 10 is a schematic of another control system of the transport vehicle of FIG. 1.
Figure 11:
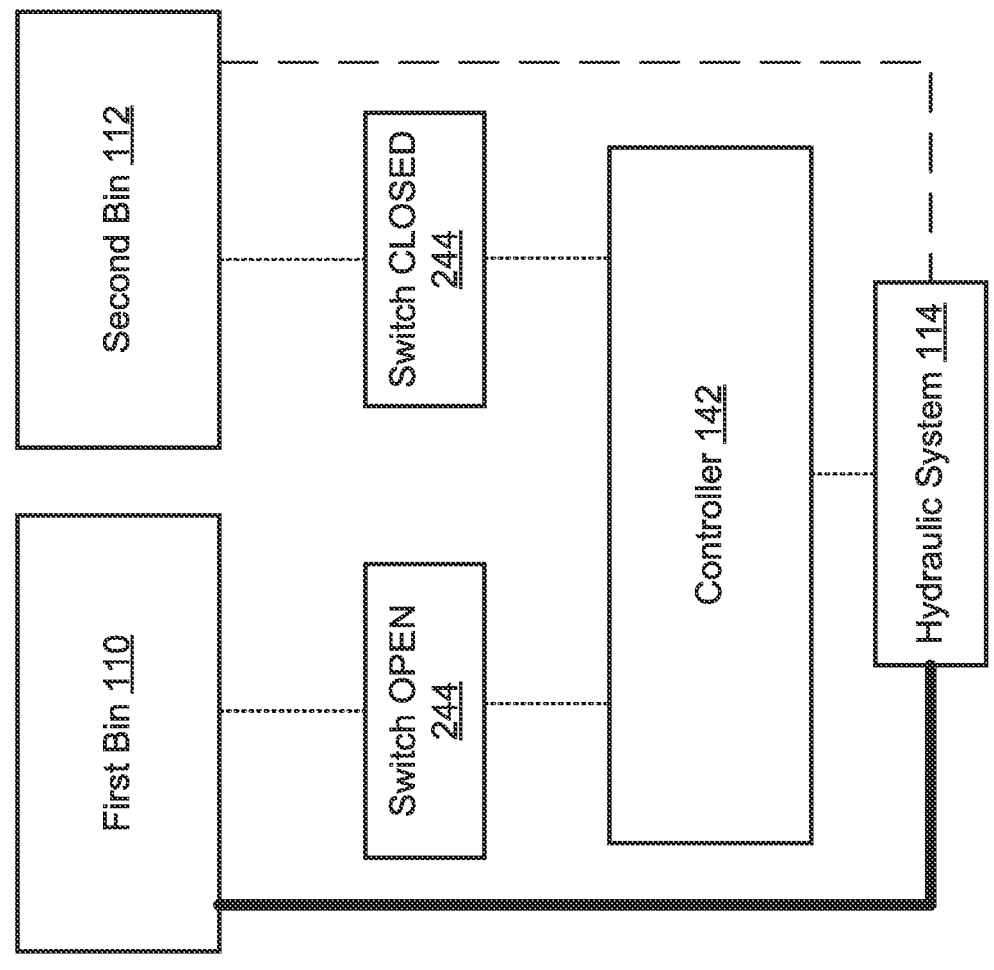
FIG. 11 is a schematic of the control system of the transport vehicle of FIG. 10.

FIGS. 10 and 11 show an example schematic of the transport vehicle 100. In some examples, the transport vehicle 100 includes switches 244. In some examples, the switches 244 are magnetic proximity switches. In such an example, the first and second bins 110, 112 each include a switch 244 in communication therewith. In some examples, the switches 244 are in an open position when the attached first or second bin 110, 112 is raised from the frame 102 from the loading position. In some examples, the switches 244 are in a closed position when the attached first or second bin 110, 112 is in the loading position. In some examples, the controller 142 communicates with the switches 244 and only allows the hydraulic system 114 to lift one of the first or second bins 110, 112 from the loading position at a time. When the switches 244 are in the closed position, meaning that both the first and second bins 110, 112 are in the loading position, the controller 142 allows the operator to, via the hydraulic system 114, lift either the first or second bin 110, 112 from the loading position. However, the controller 142 will not allow the operator to lift both the first and second bins 110, 112 simultaneously. When the switches 244 are in the open position, meaning that the first or second bin 110, 112 has left its respective loading position, the controller 142 will lock out, and prevent, the opposite bin from leaving the loading position via the hydraulic system 114. Thus, the bin that is restricted to the loading position acts as a counterweight to the lifting bin. The lifted bin will need to be rested back into the loading position before the controller 142 will allow lifting of the bin in the loading position. In some examples, the controller 142 can indicate to the operator which of the first or second bins 110, 112 is being lifted via a user interface. In some examples, the user interface includes status lights that indicate which of the first or second bins 110, 112 is actively being operated FIG. 10 shows the switch 244 attached to the first bin 110 in the closed position. In this scenario the controller 142 allows the hydraulic system 142 to lift the second bin 112 (indicated by the bold line between the hydraulic system 114 and the second bin 110), thereby positioning the switch 244 attached to the second bin 112 in the open position. In this scenario, the controller 142 prevents the hydraulic system 114 from lifting the first bin 110, as indicated by the dashed line between the hydraulic system 114 and the first bin 110.

FIG. 11 shows the switch 244 attached to the second bin 112 in the closed position. In this scenario the controller 142 allows the hydraulic system to lift the first bin 112 (indicated by the bold line between the hydraulic system 114 and the first bin 110), thereby positioning the switch 244 attached to the first bin 112 in the open position. In this scenario, the controller 142 prevents the hydraulic system 114 from lifting the second bin 112, as indicated by the dashed line between the hydraulic system 114 and the second bin 112.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A transport vehicle comprising:
a main frame having a longitudinal axis, the main frame having a first end, a second end, and a pair of sides extending therebetween, wherein the first end of the main frame includes a trailer hitch;
at least three axles, wherein each axle includes a pair of supports to support the main frame;
a first assembly positioned at the first end of the main frame, the first assembly including:
a first lifting frame parallel with the longitudinal axis of the main frame and extending upward;
a first bin having an open top connected to the first lifting frame;
a first bin lifting actuator connected to the first lifting frame and at the first bin at a first bin lifting pivot point; and
a first bin tilting actuator connected to the first lifting frame and at the first bin at a first bin tilting pivot point,
wherein, upon extension of the first bin lifting actuator and of the first bin tilting actuator, the first bin is raised from the main frame and rotated about the first bin lifting pivot point to at least partially invert the first bin toward a side of the main frame;
a second assembly positioned at the second end of the main frame including:
a second lifting frame parallel with the longitudinal axis of the main frame and extending upward;
a second bin having an open top connected to the second lifting frame;
a second bin lifting actuator connected to the second lifting frame and at the second bin at a second bin lifting pivot point; and
a second bin tilting actuator connected to the second lifting frame and at the second bin at a second bin tilting pivot point,
wherein, upon extension of the second bin lifting actuator and of the second bin tilting actuator, the second bin is raised from the main frame and rotated about the second bin lifting pivot point to at least partially invert the second bin toward the side of the main frame;
at least one sensor configured to output a signal corresponding to a position of at least one of the first and second bins; and
a hydraulic system in fluid communication with the lifting and tilting actuators of the first and second assemblies, wherein the hydraulic system allows operation of only one of the first or second assemblies at a time, based at least in part on the signal output from the at least one sensor.

2. The transport vehicle of claim 1, wherein at least two of the three axles are positioned under the second bin.

3. The transport vehicle of claim 2, wherein the supports are wheels.

4. The transport vehicle of claim 3, wherein the wheels include floatation tires.

5. The transport vehicle of claim 2, wherein the supports are tracks.

6. The transport vehicle of claim 1, wherein the at least three axles are straight axles.

7. The transport vehicle of claim 1, wherein the first and second lifting frames are configured to invert the first and second bins toward a same side of the main frame.

8. The transport vehicle of claim 1, wherein the main frame extends continuously under the first and second bins.

9. The transport vehicle of claim 1, wherein the lifting actuators of the first and second assemblies selectively extend upward to raise a top side of the first and second lifting frames to raise the first and second bin lifting pivot points upward when the first and second bins are inverted.

10. The transport vehicle of claim 1, wherein the hydraulic system includes a sequencing valve to allow only operation of either the first or second assembly at a time.

11. The transport vehicle of claim 1, wherein the at least one of the first and second bins includes a sensor to sense a property of the at least one of the first and second bins.

12. The transport vehicle of claim 11, wherein the sensor of the at least one of the first and second bins senses the existence of material within the at least one of the first and second bins.

13. The transport vehicle of claim 11, wherein the sensor is a weight sensor.

14. The transport vehicle of claim 11, wherein the sensor is a tilt sensor.

15. The transport vehicle of claim 1, further comprising a controller, wherein;

the first and second bins each have a loading and an unloading position, when in the unloading position, the first and second bins are raised from the main frame, when in the loading position, the first and second bins are positioned immediately adjacent the main frame, the at least one sensor comprises a proximity switch configured to detect the position of the at least one of the first and second bins, a first proximity sensor is in a closed position when the first bin is in the loading position and a second proximity sensor is in a closed position when the second bin is in the loading position, the first proximity sensor is in an open position when the first bin is in the unloading position and the second proximity sensor is in an open position when the second bin is in the unloading position, the controller receives at least one signal from the first proximity sensor and the second proximity sensor, and based on a position of at least one of the first proximity sensor and the second proximity sensor, the controller allows the hydraulic system to position only one of the first and second bins in the unloading position at a time.

16. A method of operating a transport vehicle comprising:

providing a transport vehicle comprising:

a main frame having a longitudinal axis, the main frame having a first end, a second end, and a pair of sides extending therebetween, wherein the first end of the main frame includes a trailer hitch;

at least three axles, wherein each axle includes a pair of supports to support the main frame;

a first assembly positioned at the first end of the main frame comprising:

a first lifting frame parallel with the longitudinal axis of the main frame and extending upward;

a first bin having an open top connected to the first lifting frame;

a first bin lifting actuator connected to the first lifting frame and at the first bin at a first bin lifting pivot point; and a first bin tilting actuator connected to the first lifting frame and at the first bin at a first bin tilting pivot point, wherein, upon extension of the first bin lifting actuator and of the first bin tilting actuator, the first bin is raised from the main frame and rotated about the first bin lifting pivot point to at least partially invert the first bin toward a side of the main frame;

a second assembly positioned at the second end of the main frame comprising:

a second lifting frame parallel with the longitudinal axis of the main frame and extending upward;

a second bin having an open top connected to the second lifting frame;

a second bin lifting actuator connected to the second lifting frame and at the second bin at a second bin lifting pivot point; and a second bin tilting actuator connected to the second lifting frame and at the second bin at a second bin tilting pivot point, wherein, upon extension of the second bin lifting actuator and of the second bin tilting actuator, the second bin is raised from the main frame and rotated about the second bin lifting pivot point to at least partially invert the second bin toward the side of the main frame;

at least one sensor configured to output a signal corresponding to a position of at least one of the first and second bins; and a hydraulic system in fluid communication with the lifting and tilting actuators of the first and second assemblies wherein the hydraulic system allows operation of only one of the first or second assemblies at a time, based at least in part on the signal output from the at least one sensor;

extending the lifting and tilting actuator of the first assembly;

raising the first bin from the main frame; and inverting the first bin to the side of the main frame.

17. The method of claim 16, further comprising:

lowering the first bin toward the main frame and, after the first bin is lowered, extending the lifting and tilting actuators of the second assembly;

raising the second bin from the main frame; and inverting the second bin to the side of the main frame.

18. The method of claim 16, wherein the hydraulic system includes a sequencing valve to only allow operation of the lifting and tilting actuators of either the first or second assembly at a time.

19. The method of claim 16, wherein the first and second bins are configured to be inverted toward a same side of the main frame.

20. The method of claim 16, further comprising;

receiving, at a controller, an output signal from at least one sensor, the output signal corresponding to a position of at least one of the first and second bin; and based on the output signal, allowing, via the controller, only one of the first and the second bin to be raised from the main frame at a time.

21. The method of claim 20, further comprising sensing the position of the at least one of the first and second bins using a proximity switch.

* * * * *